(12) United States Patent
Chen et al.

(10) Patent No.: US 12,515,923 B2
(45) Date of Patent: Jan. 6, 2026

(54) AUTOMATIC HOISTING AND TRANSPORTING METHOD FOR TOWER CRANE

(71) Applicants: GUANGZHOU INSTITUTE OF BUILDING SCIENCE GROUP CO., LTD., Guangzhou (CN); GUANGZHOU CONSTRUCTION ENGINEERING CO., LTD., Guangzhou (CN)

(72) Inventors: Hang Chen, Guangzhou (CN); Jieming Li, Guangzhou (CN); Hesong Hu, Guangzhou (CN); Mengxiong Tang, Guangzhou (CN); Quan Shao, Guangzhou (CN); Caiguang Yang, Guangzhou (CN); Xisheng Chen, Guangzhou (CN); Lingsheng Tan, Guangzhou (CN); Yu Liu, Guangzhou (CN); Shengfang Qiao, Guangzhou (CN)

(73) Assignees: GUANGZHOU INSTITUTE OF BUILDING SCIENCE GROUP CO., LTD., Guangdong (CN); GUANGZHOU CONSTRUCTION ENGINEERING CO., LTD., Guangzhou (CN)

( * ) Notice: Subject to any disclaimer, the term of this patent is extended or adjusted under 35 U.S.C. 154(b) by 643 days.

(21) Appl. No.: 17/920,039

(22) PCT Filed: Dec. 16, 2021

(86) PCT No.: PCT/CN2021/138684
§ 371 (c)(1),
(2) Date: Oct. 20, 2022

(87) PCT Pub. No.: WO2022/143193
PCT Pub. Date: Jul. 7, 2022

(65) Prior Publication Data
US 2023/0159308 A1     May 25, 2023

(30) Foreign Application Priority Data

Dec. 31, 2020  (CN) .......................... 202011615448.6
Jun. 29, 2021  (CN) .......................... 202110727448.3
Oct. 13, 2021  (CN) .......................... 202111190913.0

(51) Int. Cl.
*B66C 13/48*    (2006.01)
*B66C 23/88*    (2006.01)
*G06F 30/13*    (2020.01)

(52) U.S. Cl.
CPC .............. *B66C 13/48* (2013.01); *B66C 23/88* (2013.01); *G06F 30/13* (2020.01)

(58) Field of Classification Search
CPC .......... G06F 30/13; G06F 30/17; G06F 30/20; B66C 13/18; B66C 13/36; B66C 13/48; B66C 23/62; B66C 23/88
See application file for complete search history.

(56) References Cited

U.S. PATENT DOCUMENTS

2013/0345857 A1   12/2013  Lee
2021/0206605 A1*  7/2021  Rotem .................. B66C 13/063
(Continued)

FOREIGN PATENT DOCUMENTS

CN      102542361 A    7/2012
CN      108705532 B    10/2018
(Continued)

OTHER PUBLICATIONS

International Search Report issued in corresponding International application No. PCT/CN2021/138684, mailed Mar. 22, 2022.
(Continued)

*Primary Examiner* — Joseph C Rodriguez
(74) *Attorney, Agent, or Firm* — HOWARD M COHN and Associates, LLC

(57) ABSTRACT

Disclosed is an automatic hoisting and transporting method for a tower crane, the method including: building a three-dimensional grid model for a construction site, and generating a grid node set; generating an obstacle node set and a (Continued)

feasible area node set; obtaining coordinates of an initial node and an end node; planning a hoisting and transporting path from the initial node to the end node, and generating corresponding operating parameters; controlling the tower crane to transport an object according to the operating parameters, and calculating a swing range of the hoisted and transported object and a swing arm at a current position; determining whether a collision may occur; and predicting whether the tower crane may be overturned. The method realizes automatic hoisting and transporting of the tower crane. The object does not collide with an obstacle during hoisting and transporting, thereby ensuring safe operation of the tower crane.

15 Claims, 3 Drawing Sheets

(56) References Cited

U.S. PATENT DOCUMENTS

2021/0269287 A1* 9/2021 Iwazawa .................. B66C 23/34
2022/0363519 A1* 11/2022 Avitan .................... B66C 13/40
2023/0242380 A1* 8/2023 Ogawa ................... B66C 13/46
                                                                                          701/50
2024/0327173 A1* 10/2024 Burkhardt ............... B66C 13/48

FOREIGN PATENT DOCUMENTS

| | | |
|---|---|---|
| CN | 109610850 A | 4/2019 |
| CN | 110182696 B | 8/2019 |
| CN | 111573514 A | 8/2020 |
| CN | 111891922 A | 11/2020 |
| CN | 112850501 A | 5/2021 |
| CN | 113415728 A | 9/2021 |
| JP | 2018095370 A | 6/2018 |
| WO | 2014141928 A1 | 9/2014 |

OTHER PUBLICATIONS

Written Opinion of the International Search Authority in corresponding International application No. PCT/CN2021/138684.

* cited by examiner

AUTOMATIC HOISTING AND TRANSPORTING METHOD FOR TOWER CRANE

TECHNICAL FIELD

The present invention relates to the technical field of automatic control of tower cranes, in particular to an automatic hoisting and transporting method for a tower crane.

BACKGROUND

Tower cranes are key mechanical equipment in construction work, and can be seen everywhere in building construction sites, which can effectively save manpower, reduce construction costs and improve construction efficiency. Due to the high position of a cab in a tower crane, the field of view of a tower crane operator is greatly limited. In addition, there are buildings and obstacles in the site, which often lead to blind hoisting and blocked hoisting. A driver can only work by experience in combination with instructions of surface personnel, such that it is very blind and difficult to operate, and there are certain potential safety hazards. Meanwhile, the tower crane driver is prone to fatigue after repeating work for a long time in the small high-altitude cab, resulting in a great impact on safe production in hoisting and transporting operation of the tower crane. In order to solve this problem, an existing technology provides assistance for the driver mainly by arranging a tower crane operation monitoring system and acquiring operating parameters and video images of the tower crane to reduce visual blind zones. Tower crane driving is greatly affected by human factors, so the problem of driver fatigue driving still exists. As a result, an unmanned tower crane is an important direction for the research and development of new tower cranes.

Path planning and collision avoidance need to be taken into account for the realization of unmanned driving of tower cranes. According to a control method and an intelligent system for an unmanned tower crane designed in an invention patent application CN110182696A, a transport trajectory is generated by acquiring a real-time map where the tower crane is located, and intelligent obstacle avoidance is performed by using a simultaneous localization and mapping (SLAM) algorithm, a perception algorithm and other methods to achieve automatic control of the tower crane, but there is no specific technical solutions for the realization of hoisting and transporting path planning. According to a two-dimensional code-based automatic control system and control method for a tower crane designed in an invention patent application CN110482409A, it is proposed to search for a hoisting and transporting path by using a rapidly exploring random tree (RRT) algorithm, which can rapidly obtain a feasible path from an initial node to an end node, but this path is not necessarily an optimal path. According to a machine vision-based navigation method for prefabricated building construction proposed in an invention patent application CN109610850A, an implementation mode for calculating a hoisting and transporting path by using an ant colony algorithm is proposed. At present, an anti-collision technology for a tower crane mainly includes a video monitoring technology and sensor monitoring. A current video monitoring technology is not targeted and is only used for live image recording of a tower crane, such that image data information is not fully utilized for analysis, and a tower crane operator cannot be directly guided in operation or automatic operation cannot be realized. In a sensor monitoring mode, due to the restriction on installation of sensors at some key parts of a boom and a pull rod of a tower crane, setting of monitoring nodes is limited, such that the sensor-based monitoring mode has limited monitoring capability, obtained information is only limited to some sensitive technical parameters, and more comprehensive and intuitive tower crane operation conditions cannot be obtained in time.

None of the above can achieve better automatic path planning, so those skilled in the art urgently need to find a new technical solution to solve the above problems.

SUMMARY

In view of the technical problems in the prior art, the present invention provides an automatic hoisting and transporting method for a tower crane.

The present invention discloses an automatic hoisting and transporting method for a tower crane, the method including:
building a three-dimensional grid model for a construction site, and generating a grid node set $\Phi_0$;
generating an obstacle node set $U_0$ and a feasible area node set $\Phi_1$ according to the positions of the obstacles in the construction site and the grid node set $\Phi_0$;
obtaining coordinates of an initial node S and an end node G of a hoisting and transporting operation in the three-dimensional grid model;
planning a hoisting and transporting path from the initial node S to the end node G according to the initial node S, the end node G, the feasible area node set $\Phi_1$ and a preset hoisting and transporting path planning strategy, and generating corresponding operating parameters;
controlling the tower crane to transport an object according to the operating parameters, and calculating a swing range of the hoisted and transported object and a swing arm at a current position according to a preset swing range calculation strategy;
determining whether a collision may occur according to the swing range and the obstacle node set $U_0$;
if not, controlling the tower crane to continue to transport the object according to the hoisting and transporting path;
if yes, controlling the tower crane to be braked; and
predicting whether the tower crane may be overturned according to a preset overturning calculation strategy during braking of the tower crane.

The automatic hoisting and transporting method for the tower crane in the present invention replaces a manned driving mode. It takes the three-dimensional grid model of the construction site as the basis for hoisting and transporting path planning, modifies the data structure, which greatly shortening the calculation time, and improving the efficiency of path planning; by generating the obstacle node set, the relevant nodes can be avoided during path planning, so as to eliminate the problem of visual blind zones in manned driving and ensure that the object does not collide with the obstacle during hoisting and transporting, guaranteeing safe operation of the tower crane; the aerial hoisting and transporting path is planned according to the preset path planning strategy and the coordinates of the initial node and the end node of the hoisting and transporting operation, such that the heavy object is transported with higher efficiency under the condition of no collision, and the time and effort are saved; and whether the tower crane may be overturned is predicted according to the preset overturning calculation strategy during transportation, so as to prevent dangerous events from happening.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Apparently, the accompanying drawings in the description below are merely some embodiments of the present invention. Those of ordinary skill in the art may also derive other accompanying drawings from these accompanying drawings without creative efforts.

DETAILED DESCRIPTION OF EMBODIMENTS

The technical solutions in the embodiments of the present invention will be clearly and completely described below with reference to the accompanying drawings of the present invention. Apparently, the described embodiments are merely a part, rather than all of the embodiments of the present invention. Based on the embodiments of the present invention, all other embodiments obtained by those of ordinary skill in the art without creative efforts fall within the scope of protection of the present invention.

Figure 1:
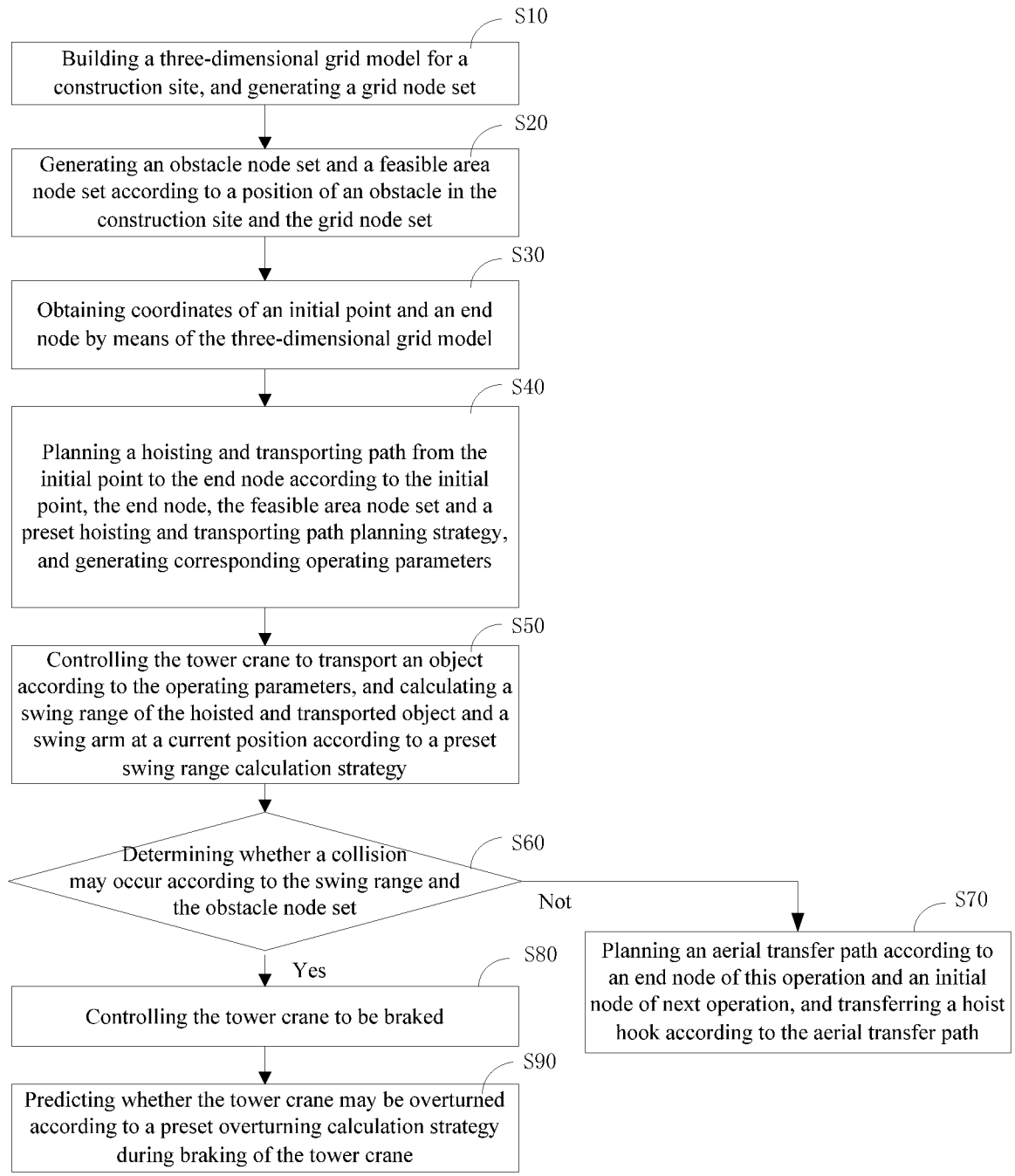
FIG. 1 is a flowchart (one) of steps of an automatic hoisting and transporting method for a tower crane in an embodiment of the present invention.

As shown in FIG. 1, an embodiment of the present invention discloses an automatic hoisting and transporting method for a tower crane, the method including:

Step S10: a three-dimensional grid model for a construction site is built, and a grid node set $\Phi_0$ is generated.

Figure 2:
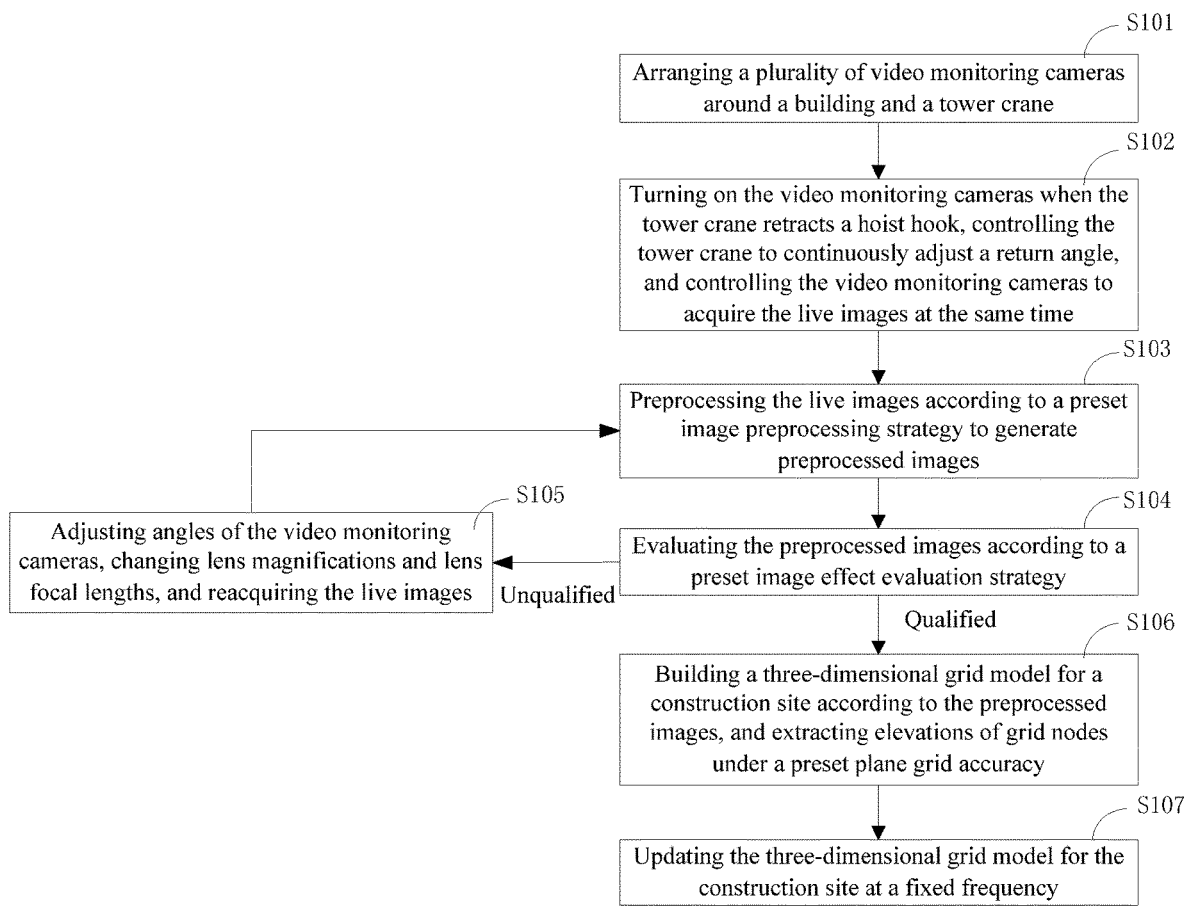
FIG. 2 is a flowchart (two) of steps of an automatic hoisting and transporting method for a tower crane in an embodiment of the present invention.

As shown in FIG. 2, the three-dimensional grid model for the construction site is built and may be implemented by the following steps:

Step S101: a plurality of video monitoring cameras are arranged around a building and the tower crane.

The video monitoring cameras in this embodiment are configured to acquire live images around the building and the tower crane. The number of the live images is not limited here. Preferably, it is the best implementation mode that may ensure that there is no shooting dead angle around the building and the tower crane.

Step S102: the video monitoring cameras are turned on when the tower crane retracts a hoist hook, the video monitoring cameras are controlled to continuously adjust the shooting angles and acquire the live images at the same time.

Step S103: the live images are preprocessed according to a preset image preprocessing strategy to generate preprocessed images.

An objective of the image preprocessing is to distinguish the objects from the background and reduce interference factors in subsequent steps. Main processing modes include image enhancement, increase in a contrast between the moving object and the background, image edge detection, etc. Features of the tower crane, a boom and the hoist hook are extracted to facilitate positioning of the moving object.

Step S104: the preprocessed images are evaluated according to a preset image effect evaluation strategy.

The preset image effect evaluation strategy may be set by those skilled in the art. For example, when an image with a chaotic background appears, it is not conducive to feature extraction, such that if the processing effect of the preprocessed images is unqualified, Step S105 is performed.

Step S105: angles of the video monitoring cameras are adjusted, lens magnifications and lens focal lengths are changed, and the live images are reacquired. Step S103 and Step S104 continue to be performed for preprocessing the live images and evaluating the preprocessed images.

If the processing effect of the preprocessed images is qualified, Step S106 is performed.

Step S106: the three-dimensional grid model for the construction site is built according to the preprocessed images, and elevations $z_0$ of grid nodes $(x_0, y_0)$ are extracted under a preset plane grid accuracy.

In this step, the three-dimensional grid model for the construction site is built, coordinates of the grid nodes are determined, and the grid node set $\Phi_0$ is correspondingly generated. Model building may be performed by model building methods such as oblique photography, three-dimensional laser scanning, etc. The plane grid accuracy is set by those skilled in the art. In view of the size of the overall model, it is more appropriate to set the plane grid accuracy to be 1 m.

A coordinate system is established in the three-dimensional grid model for the construction site. Since the boom of the tower crane rotates with the tower crane base as a center, the origin of the Cartesian coordinate of the construction site can be set to the tower crane base. In order to better reflect an actual working mode of the tower crane, the coordinate system with the center of the tower crane base as the origin in the three-dimensional grid model is transformed into a cylindrical coordinate system. If a coordinate of a node in the three-dimensional grid model is (x,y,z), then a coordinate thereof in the cylindrical coordinate system is (r,θ,h). The changes of the coordinate r, θ, h reflect amplitude change, rotation and hoisting motion of the tower crane, respectively. A transformational relationship between the coordinates is as follows:

$$\begin{cases} r = \sqrt{x^2 + y^2} \\ \theta = \arctan\left(\frac{y}{x}\right) \\ h = z \end{cases}$$

When the three-dimensional grid model is built in a cylindrical coordinate, this embodiment further includes: (1) with a central axis of a tower body of the tower crane as a longitudinal axis of the cylindrical coordinate, angular coordinates θ are equally divided into a parts by a set step length; (2) the angular coordinates θ of all nodes are transformed into integers between 0 and a−1; and (3) with the angular coordinates of the nodes as indexes of a first-level list, radius coordinates r and height coordinates h of the nodes are taken as a second-level list. Preferably, the angular coordinates θ are equally divided into 360 parts by the set step length of 1°, the angular coordinates θ of all the nodes are transformed into the integers between 0 and 359, and then with the angular coordinates as the indexes of the first-level list, the radius coordinates r and height coordinates h of the nodes are stored in the second-level list. Namely:

$$list = \begin{cases} [(r_{0,0}, h_{0,0}), (r_{0,1}, h_{0,1}), (r_{0,2}, h_{0,2}), \ldots] & \to \theta = 0 \\ [(r_{1,0}, h_{1,0}), (r_{1,1}, h_{1,1}), (r_{1,2}, h_{1,2}), \ldots] & \to \theta = 1 \\ \ldots & \to \ldots \\ [(r_{359,0}, h_{359,0}), (r_{359,1}, h_{359,1}), (r_{359,2}, h_{359,2}), \ldots] & \to \theta = 359. \end{cases}$$

Step S107: the three-dimensional grid model for the construction site is updated at a fixed frequency.

After the three-dimensional grid model for the construction site is built, the model is always updated at the fixed frequency when subsequent steps are performed.

The three-dimensional grid model is built by the above method, and then the grid node set $\Phi_0$ is generated in the following way:

A preset allowable amplitude change range $[r_{min}, r_{max}]$, allowable rotation range $[\theta_{min}, \theta_{max}]$, and allowable hoisting range $[h_{min}, h_{max}]$ of the tower crane are obtained. An operator may preset the allowable amplitude change range $[r_{min}, r_{max}]$, the allowable rotation range $[\theta_{min}, \theta_{max}]$, and the allowable hoisting range $[h_{min}, h_{max}]$ of the tower crane according to a structure of the tower crane.

m、n、P equal division is performed on the allowable amplitude change range $[r_{min}, r_{max}]$, the allowable rotation range $[\theta_{min}, \theta_{max}]$, and the allowable hoisting range $[h_{min}, h_{max}]$ of the tower crane, respectively.

The grid node set $\Phi_0$ of nodes $(r, \theta, h)$ is generated as follows:

$$\Phi_0 = \left\{ (r_i, \theta_j, h_k) \middle| \begin{array}{l} r_i = r_{min} + \dfrac{r_{max} - r_{min}}{m} \times i, \quad i = 0, 1, \ldots, m \\ \theta_j = \theta_{min} + \dfrac{\theta_{max} - \theta_{min}}{n} \times j, \quad j = 0, 1, \ldots, n \\ h_k = h_{min} + \dfrac{h_{max} - h_{min}}{p} \times k, \quad k = 0, 1, \ldots, p \end{array} \right\},$$

where when m、n、P equal division is respectively performed on the allowable amplitude change range $[r_{min}, r_{max}]$, the allowable rotation range $[\theta_{min}, \theta_{max}]$, and the allowable hoisting range $[h_{min}, h_{max}]$ of the tower crane, n, P need to meet the following conditions:

$$\begin{cases} \Delta r = \dfrac{r_{max} - r_{min}}{m} \leq \min(1, l_m) \\ \Delta \theta = \dfrac{\theta_{max} - \theta_{min}}{n} \times r_{max} \leq \min(1, l_m) \\ \Delta h = \dfrac{h_{max} - h_{min}}{p} \leq \min(1, l_m) \end{cases}.$$

In other words, it is required that the accuracy after grid division is not less than a smaller value between 1 m and a maximum distance $l_m$, where $l_m$ is the maximum distance between the edge of the object (or the hoist hook) and its centroid coordinate, suppose the centroid coordinate of the hoisted and transported object is $(x_m, y_m, z_m)$, and the maximum distance between the edge of the hoisted and transported object and the centroid coordinate $(x_m, y_m, z_m)$ is $l_m$.

If implementation is on the basis of the angular coordinates of the nodes as the indexes of the first-level list in the above embodiment, then a value of n in this embodiment is 360, and the allowable rotation range $[\theta_{min}, \theta_{max}]$ is $[0, 359]$.

Step S20: an obstacle node set $U_0$ and a feasible area node set $\Phi_1$ are generated according to the positions of the obstacles in the construction site and the grid node set $\Phi_0$.

In order to ensure that the object hoisted by the tower crane during hoisting do not collide with the obstacle in the construction site, it is necessary to determine the obstacle node set $U_0$ according to the grid node set $\Phi_0$ and the position, size and shape of the obstacle in the construction site, and then obstacle nodes present in the grid node set $\Phi_0$ are removed to obtain the feasible area node set $\Phi_1$ where the hoist hook and the heavy object may move freely. The feasible area node set $\Phi_1$ is as follows:

$$\Phi_1 = \Phi_0 - \left\{ (r, \theta, h) \middle| \begin{array}{l} |r - r_u| < l_m + l_{extra} \\ |\theta - \theta_u| \times r < l_m + l_{extra}, (r, \theta, h) \in \Phi_0, (r_u, \theta_u, h_u) \in U_0 \\ |h - h_u| < l_m + l_{extra} \end{array} \right\}$$

where $(r_u, \theta_u, h_u)$ is a coordinate of the obstacle, $U_0$ is the obstacle node set, and $l_{extra}$ is a set amount of redundancy. The amount of redundancy $l_{extra}$ refers to that the operator sets a value for ensuring safety according to the law of tower crane operation, and its specific value is not limited here.

Step S30: coordinates of the initial node S and the end node G of a hoisting and transporting operation are obtained by means of the three-dimensional grid model.

In the Cartesian coordinate system:

The coordinate of the center of the tower crane base in the Cartesian coordinate system is set to be $(a_0, b_0, c_0)$.

The coordinates of the initial point S and the end point G in the Cartesian coordinate system are obtained, and are respectively $(a_s, b_s, c_s)$ and $(a_g, b_g, c_g)$ The coordinates of the initial point S and the end point G in the Cartesian coordinate system are transformed into coordinates in the three-dimensional grid model, which are respectively an initial point $S(x_s, y_s, z_s)$ and an end point $G(x_g, y_g, z_g)$, where $$\begin{cases} x_s = a_s - a_0 \\ y_s = b_s - b_0 \\ z_s = c_s - c_0 \end{cases},$$

$$\begin{cases} x_g = a_g - a_0 \\ y_g = b_g - b_0 \\ z_g = c_g - c_0 \end{cases}.$$

Size information of the hoisted and transported object is obtained, and the centroid coordinate $(x_m, y_m, z_m)$ of the hoisted and transported object and the maximum distance $l_m$ between the edge of the hoisted and transported object and the centroid coordinate $(x_m, y_m, z_m)$ are determined, or in the absence of the hoisted and transported object, a centroid coordinate of the hoist hook and a maximum distance between an edge of the hoist hook and the centroid coordinate are determined.

Alternatively, the coordinate $(r_s, \theta_s, h_s)$ of the initial point S and the coordinate $(r_G, \theta_G, h_G)$ of the end point G are correspondingly obtained in a mode of transformation between the Cartesian coordinate system and the cylindrical coordinate system in the foregoing embodiment.

Step S40: a hoisting and transporting path from the initial node S to the end node G is planned according to the initial node S, the end node G, the feasible area node set $\Phi_1$ and a preset hoisting and transporting path planning strategy, and corresponding operating parameters are generated.

Specifically, in an embodiment of the present invention, the hoisting and transporting path planning strategy includes:

The feasible area node set $\Phi_1$ is searched for nodes closest to the initial node $S(x_s,y_s,z_s)$ and the end node $G(x_g,y_g,z_g)$, where the nodes are respectively $(r_s,\theta_s,h_s)$ and $(r_g,\theta_g,h_g)$.

An area near the initial node S and the end node G is an operational area with high density of personnel, machines and tools, and obstacles, and the surrounding environment is constantly changing dynamically, such that when the heavy object is hoisted, it is not suitable to move horizontally in the area near the initial node S and the end node G. During hoisting and transporting, in this embodiment, the heavy object is vertically ascended to a certain height from the initial node S to reach a node $\overline{S}$ (hereinafter referred to as an aerial initial node $\overline{S}$), is moved to a safety height node $\overline{G}$ (hereinafter referred to as an aerial end node $\overline{G}$) over the end node G, and then is vertically descended to the end node G, so as to ensure the safety of operation.

The safety height may be set by means of a constant method or a ratio method. The constant method is to manually determine a constant value $h_{safe}$ of the safety height according to an actual situation of the site; and the ratio method is to determine a safety ratio $\lambda_{safe}$ and divide a space above the initial node or the end node according to the ratio. By taking the initial node $S(r_s,\theta_s,h_s)$ as an example, a coordinate of the aerial initial node $\overline{S}$ after vertical ascent is $(r_s,\theta_s,\overline{h}_s)$, and the height $\overline{h}_s$ of the node $\overline{S}$ is $\overline{h}_s = h_s + m_{safe} \cdot \Delta h$, where $m_{safe}$ is the number of grids for ascent, $\Delta h$ is the height of a grid. A calculation method for $m_{safe}$ includes:

(1) the constant method:

$$m_{safe} = \left\lceil \frac{h_{safe}}{\Delta h} \right\rceil;$$

and
(2) the ratio method:

$$m_{safe} = \left\lceil \lambda_{safe} \cdot \frac{h_{max} - h}{\Delta h} \right\rceil,$$

where $\lceil \ldots \rceil$ is a round-up operator.

In addition, the preset safety height value is obtained, where the safety height value includes an ascent height value and a descent height value, the ascent height value and the descent height value are respectively $\overline{h}_s = h_s + m_{safe} \cdot \Delta h$ and $\overline{h}_g = h_g + m_{safe} \cdot \Delta h$, $m_{safe}$ is the number of grids for ascent or descent, and $\Delta h$ is the height of one grid.

A reachable node set open list and an unconcerned node set close list are established. The former represents a set of reachable nodes to be checked, and the latter represents a set of nodes that no longer need to be concerned about.

The aerial initial node $\overline{S}(r_s,\theta_s,\overline{h}_s)$ is put into the reachable node set open list, nodes in the unconcerned node set close list are skipped, reachable nodes adjacent to the aerial initial node $\overline{S}$ in the feasible area node set $\Phi_1$ are added to the reachable node set open list, and parent nodes of these nodes are set as $\overline{S}(r_s,\theta_s,\overline{h}_s)$.

The aerial initial node $\overline{S}(r_s,\theta_s,\overline{h}_s)$ is put into the unconcerned node set close list.

Cost values $f(n)=g(n)+h(n)$ of all nodes in the reachable node set open list are calculated, where $g(n)$ represents an actual cost from the aerial initial node $\overline{S}$ to a node $n(r_n,\theta_n,\overline{h}_n)$, $h(n)$ represents an estimated cost from the node $n(r_n,\theta_n,h_n)$ to the aerial end node $\overline{G}(r_g,\theta_g,\overline{h}_g)$, and $h(n)=|r_n-r_g|+|\theta_n-\theta_g|+|h_n-\overline{h}_g|$. A node N with a minimum cost value $f(n)$ is extracted from the reachable node set open list and put into the unconcerned node set close list; the nodes in the unconcerned node set close list are skipped, the feasible area node set $\Phi_1$ is searched for all reachable nodes adjacent to the node N, and if the nodes are not in the reachable node set open list, the nodes are added to the reachable node set open list, and parent nodes of the nodes are set to be N; if the nodes are already in the reachable node set open list, whether actual costs $g(n)$ from the node N to the nodes are less than previous values is calculated, and if yes, the parent nodes of the nodes are set to be N; and if not, any operation is not performed.

The previous step is repeated, until the aerial end node $\overline{G}(r_g,\theta_g,\overline{h}_g)$ is added to the reachable node set open list.

Starting from the aerial end node $\overline{G}(r_g,\theta_g,\overline{h}_g)$, moving is performed along the parent node of each of the nodes, and until the aerial initial node $\overline{S}(r_s,\theta_s,\overline{h}_s)$ is reached, an aerial hoisting and transporting path is formed.

The hoisting and transporting path is from the initial node S, the aerial initial node $\overline{S}$, and the aerial end node $\overline{G}$ to the end node G.

Figure 3:
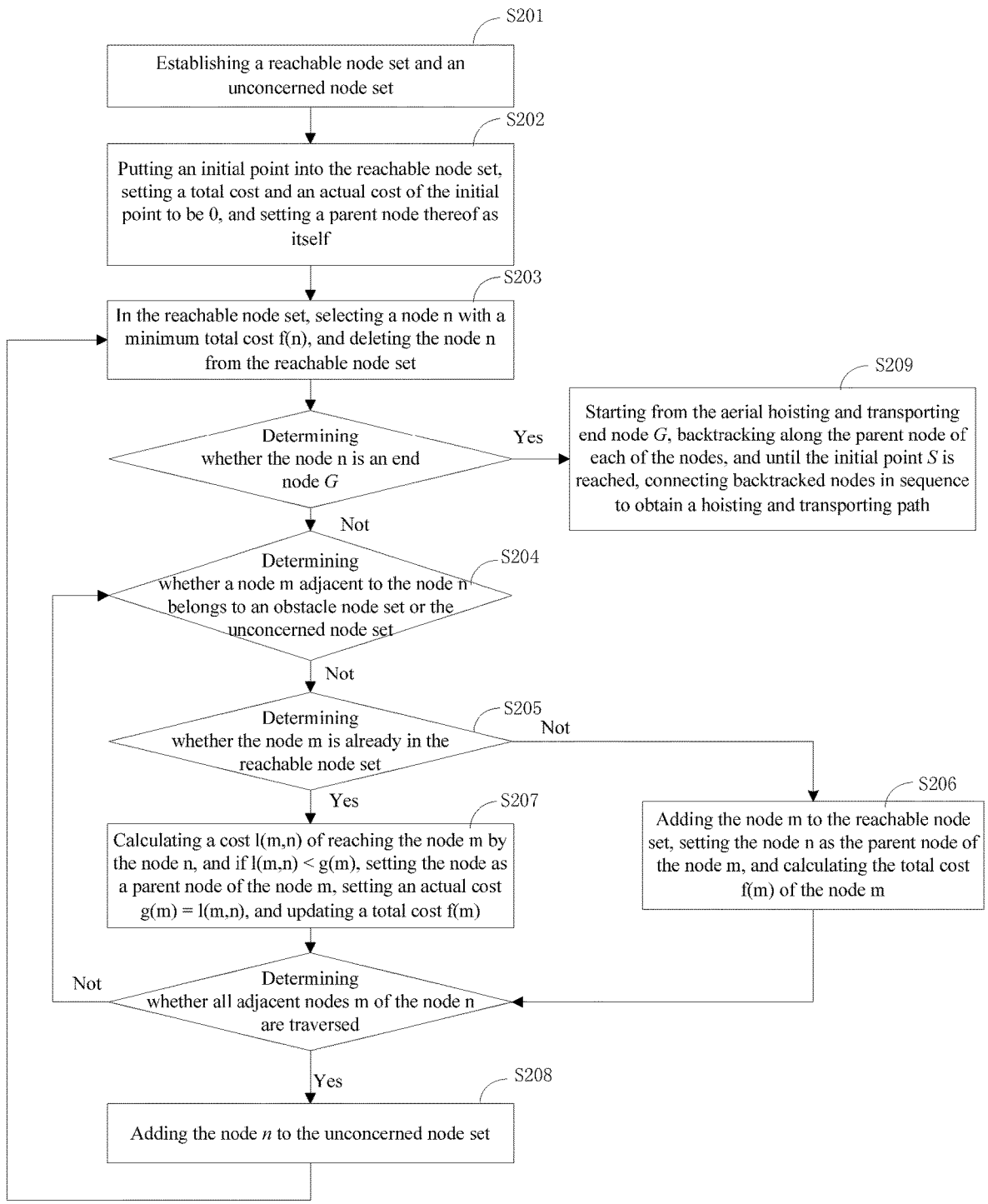
FIG. 3 is a flowchart (three) of steps of an automatic hoisting and transporting method for a tower crane in an embodiment of the present invention.

Specifically, in another embodiment of the present invention, as shown in FIG. 3, the hoisting and transporting path planning strategy includes:

S201: a reachable node set open list and an unconcerned node set close list are established.

The reachable node set open list and the unconcerned node set close list are established by the foregoing embodiment.

S202: the initial node S is put into the reachable node set open list, a total cost $f(S)$ and an actual cost $g(S)$ of the initial node S are set to be 0, and a parent node thereof is set as itself.

S203: in the reachable node set open list, a node n with a minimum total cost $f(n)$ is selected, and the node n is deleted from the reachable node set open list, where a coordinate of the node n is $(r_n,\theta_n,h_n)$, the total cost of the node n is $f(n)=g(n)+h(n)$ $g(n)$ is the actual cost of the node n, $h(n)$ is a heuristic function of the node n, $h(n)=k_1(h_{mid}-h_n)+k_2+k_3(|r_n-r_G|+|\theta_n-\theta_G|)+k_4|h_n-h_G|$, $k_1, k_2, k_3, k_4$ are preset weight functions, and $h_{mid}$ is a preset safety height value that needs to be ensured before wide-range horizontal motion.

Specifically, in this embodiment, a weight function $k_1$ is mainly used to control the path to move up first to a target height $h_{mid}$ during hoisting. An expression of the weight function $k_1$ is as follows:

$$k_1(n) = \begin{cases} 10, & d(n,S) < \rho \text{ and } h_n < h_{mid} \\ 0, & d(n,G) < \rho \\ 1, & \text{others} \end{cases},$$

where $d(n,S)$ represents a Euclidean distance between the node n and the initial node S, $d(n,G)$ represents a Euclidean distance between the node n and the end node G, and $\rho$ is a preset radius range.

A weight function $k_2$ in this embodiment is mainly used to increase costs of nodes near the initial node and below the target height $h_{mid}$ as a whole, so as to ensure smooth search for nodes outside the area after hoisting to the target height. When $\lambda$ is set to be a constant at least an order of magnitude larger than $d(S,G)$ then an expression of the weight function $k_2$ is as follows:

$$k_2(n) = \begin{cases} \lambda, & d(n,S) < \rho \text{ and } h_n < h_{mid} \\ 0, & \text{others} \end{cases},$$

where d(S,G) represents a Euclidean distance between the initial node S and the end node G.

In this embodiment, a weight function $k_3$ is mainly used to control horizontal motion to the end node G. An expression of the weight function $k_3$ is as follows:

$$k_3(n) = \begin{cases} 0, & d(n, S) < \rho \text{ and } h_n < h_{mid} \\ 1, & \text{others} \end{cases}.$$

In this embodiment, a weight function $k_4$ is mainly used to control vertical motion to the end node G. A value of the weight function $k_4$ may be a constant of 1.

The safety height $h_{mid}$ is comprehensively determined according to the height of the initial node S and the end node G and an allowable maximum ascent height $h_{max}$ of the tower crane.

The safety height value is $h_{mid}=\max(h_S,h_G)+(h_{max}-\max(h_S,h_G))/2$.

S204: a node m adjacent to the node n is obtained, and whether the node m belongs to the obstacle node set $U_0$ or the unconcerned node set close list is determined, where a coordinate of the node m is $(r_m,\theta_m,h_m)$.

In this step, whether the node M belongs to the obstacle node set or the unconcerned node set close list is determined by comparing a coordinate $(r_m,\theta_m,h_m)$ of the node m with coordinates of nodes in the obstacle node set $U_0$ and the unconcerned node set close list one by one. When the obstacle node set $U_0$ and the unconcerned node set close list are relatively large, the number of comparisons will be greatly increased, such that the comparison process is slowed down to reduce the efficiency of path planning. Especially for the obstacle node set $U_0$, due to the large work site of the tower crane, in order to ensure the path accuracy of the tower crane, the site is divided into space grids with a side length of each unit not greater than 1 m according to the previous steps, such that there are at least hundreds of thousands of obstacle nodes, resulting in a large number of comparisons.

For this, the embodiment of the present invention adopts a form of the foregoing nested list, including: the first-level list in the obstacle node set or the unconcerned node set close list is indexed with the angular coordinate $\theta_m$ of the node m to find the corresponding second-level list; and the corresponding second-level list is searched for the corresponding $(r_m,h_m)$. When whether the node m belongs to the obstacle node set $U_0$ or the unconcerned node set close list is queried, it is only necessary to query whether the $\theta_m$-th second list has a corresponding coordinate $(r_m, h_m)$ with its angular coordinate $\theta_m$ as an index. By means of the above method, most of elements in the list may be directly excluded during comparison to greatly reduce the number of times of determination. Similarly, the radius coordinates r or the height coordinates h may also be used as the indexes, but in a work scenario of the tower crane, the angular coordinates $\theta$ can often contain more integers, so it is more recommended to use the angles as the indexes.

If the node m does not belong to the obstacle node set $U_0$ or the unconcerned node set close list, S205 is performed.

S205: whether the node m is already in the reachable node set open list.

S206: if the node m is not in the reachable node set open list, the node m is added to the reachable node set open list, the node n is set as a parent node of the node m, and a total cost $f(m)=g(m)+h(m)$ of the node m is calculated, where $g(m)$ represents an actual cost of moving from the initial node S to the node m via the parent node n thereof, $g(m)=g(n)+|r_m-r_n|+r_n\cdot|\theta_m-\theta_n|+|h_m-h_n|$, $h(m)$ is a heuristic function of the node m, and $h(m)=k_1(h_{mid}-h_m)+k_2+k_3(|r_m-r_G|+\theta_m-\theta_G|)+k_4|h_m-h_G|$.

S207: if the node m is already in the reachable node set open list, a cost $l(m,n)=g(n)+|r_m-r_n|+r_n\cdot|\theta_m-\theta_n|+|h_m-h_G|$ of reaching the node m from the initial node S via a non-parent node n is calculated, the cost $l(m,n)$ is compared with the actual cost $g(m)$, and if $l(m,n)<g(m)$ the node n is set as the parent node of the node m, the actual cost is set to be $g(m)=l(m,n)$, and the total cost $f(m)$ is updated.

The node n has multiple adjacent nodes m, so S208 is performed after all the adjacent nodes m of the node n are traversed via S204 to S207.

S208: the node n is added to the unconcerned node set close list.

S203 to S208 are repeated, until the node selected from the reachable node set open list is the end node G.

S209: starting from the aerial end node G, backtracking is performed along the parent node of each of the nodes, and until the initial node S is reached, backtracked nodes are connected in sequence to obtain a hoisting and transporting path.

According to the present invention, the corresponding operating parameters are generated after the hoisting and transporting path from the initial node S to the end node G is planned by the above listed embodiment.

Step S50: the tower crane is controlled to transport the object according to the operating parameters, and a swing range of the hoisted and transported object and a swing arm at a current position is calculated according to a preset swing range calculation strategy.

Based on an optical flow algorithm, a velocity vector is assigned to each pixel point in the image to form a motion vector field. When there is the moving object in the image, the object and the background move relatively. The velocity vector formed by the moving object must be different from the velocity vector of the background. A corresponding relationship present between a previous frame and a current frame is found by means of changes of changing pixels in an image sequence in a time domain and a correlation between adjacent frames, thereby calculating out motion information of the object between the adjacent frames, and predicting a motion trend of the object.

According to this, the position of the object may be calculated and the moving object is tracked, where an instantaneous motion velocity of the object in a certain frame is $v_0$, and an instantaneous motion velocity of the object in a next frame of image is $v_1$. According to a live image acquisition frequency of the video monitoring camera, a time interval t of two frames of images is obtained, and a motion acceleration $$a = \frac{v_1 - v_0}{t}$$

of the heavy object may be obtained. The velocity and acceleration of the object when it falls to the ground may be estimated by means of these changes to avoid collision and impact. When the heavy object reaches a target landing position, in the direction of a motion trajectory of the object, an acceleration is $a \leq 0$, and a velocity is $v=0$, such that the object falls to the ground smoothly without collision. When the current position H is less than a safety distance $$S = \frac{v^2}{2a},$$

a motor is controlled to increase a pull force, until H≥S. In order to ensure the safety, a is controlled to be as small as possible, namely, H=S.

According to the three-dimensional grid model for the construction site, the tower crane, the swing arm, the hoist hook and the object are set as a space A, and the building and surrounding buildings are set as a space B. When A∩B=∅, the tower crane is free from collision.

The motion of the object is decomposed into sub-motions in three directions. The object horizontally moves up or down in a vertical direction under the pull force $F_1$ of the tower crane. The object horizontally moves left or right under an action force $F_2$ of a trolley. The boom of the tower crane rotates in a horizontal plane under an action force $F_3$ of a rotation mechanism to drive the object to rotate on the horizontal plane. In linear motion, a resultant velocity and a resultant external force of the object must be kept parallel in direction, namely (G is the gravity of the object)

$$(F_1-G):F_2:F_3=(x_1-x_0):(y_1-y_0):(z_1-z_0)$$

Thus, the motion of the object should satisfy the following conditions:

$$\lim \frac{(F_1-G):F_2:F_3}{(x_1-x_0):(y_1-y_0):(z_1-z_0)} = 1$$

$$K = \lim \frac{\Delta \alpha}{\Delta s} = 0$$

where K is the curvature of the motion trajectory, Δs is the length of the trajectory, and Δα is a tangential angle between the initial node and the end node.

According to the predicted motion trend of the object, the action forces of the motor in the three directions are dynamically adjusted, such that the motion trajectory tends to an optimal path.

Specifically, the calculating a swing range of the object and a swing arm at a current position according to a preset swing range calculation strategy, includes:

An operation mode of the tower crane is identified, where the operation mode includes a hoisting mode, an amplitude change mode, a rotation mode, a rotation and amplitude change mode, a hoisting and amplitude change mode, a hoisting and rotation mode and a hoisting, rotation and amplitude change mode.

Braking parameters are calculated according to the operation mode, where the braking parameters include braking time of the swing arm, a braking distance of the swing arm, a braking angle of the swing arm, a braking distance of the object, a swing amplitude of the object, the length of a cable, an angle between the cable and the vertical direction, braking time of the trolley, and a braking distance of the trolley.

After the tower crane starts to operate, the motion of the object is tracked according to the optical flow algorithm, and dynamic coordinates and motion changes of the tower crane and the object are obtained, where real-time operating parameters at least include the length $l_0$ of the current cable, a velocity $v_c$ of the cable, a rotation angle $\theta_0$, an angular velocity $\omega$ of rotation, an amplitude $r_0$ of the trolley, an amplitude change velocity $v_r$ of the trolley, a coordinate $(r_1, \theta_1, h_1)$ of the hoisted and transported object, a velocity $v_r$ of the hoisted and transported object, the length $r_m$ of the swing arm, the height $h_0$ of the swing arm, a hoisting load $F_c$, and average accelerations $\alpha_c$, $\alpha$ and $\alpha_r$ during vertical locking, rotation locking and transverse locking, a node set $U_t$ including grid coordinates $(r_1, \theta_1, h_1)$ of an outer contour of the construction site, etc.

The swing range of the object and the swing arm is calculated according to the braking parameters.

(1) The process for calculating the braking parameters and the swing range in the hoisting mode, includes:

In the case of only hoisting, the swing arm and the trolley are both stationary, and the object only operates in the vertical direction, such that after locking in the vertical direction, the braking distance $$S_m = \frac{v_c^2}{2a_c}$$

of the object is calculated.

The swing range is $W=\{(r_1,\theta_1,h_1)|h \in [h_1, h_1+S_m]\}$.

(2) The process for calculating the braking parameters and the swing range in the amplitude change mode, includes: In the case of only amplitude change, the swing arm and the cable are both stationary, the object only moves in a vertical plane where the swing arm is located. After transverse locking, the braking time $$t = \frac{v_r}{a_r}$$

of the trolley is calculated, the braking distance of the trolley is $$S_c = \frac{v_r^2}{2a_r}.$$

The amplitude of the trolley after braking is $r_0+S_c$. If it is assumed that the object still moves at the original velocity after braking, then the coordinate of the object after braking is $(r_1+v_1 t, \theta_1, h_1+l_0(1-\cos \alpha_1))$ where $\alpha_1$ is an angle between the cable and the vertical direction after braking as follows:

$$\alpha_1 = \arctan \frac{r_1 + v_1 t - r_0 - S_c}{l_0}.$$

After braking, the object starts to do a simple pendulum motion, and a velocity component of the object perpendicular to the cable is $v_1 \cos \alpha_1$. Due to energy conservation, the ascent height $$\Delta h = \frac{v_1^2 \cos^2 \alpha_1}{2g}$$

of the object at a maximum swing amplitude is calculated, where g is an acceleration of gravity. An angle $$\alpha_2 = \arccos \frac{l_0 \cos \alpha_1 - \Delta h}{l_0}$$

between the cable and the vertical direction is calculated. The coordinate of the object at the maximum swing amplitude is $(r_0+S_c\pm l_0 \sin \alpha_2, \theta_1, h_1+l_0 (1-\cos \alpha_2))$. Thus, the swing range is $W=\{(r_1,\theta_1,h)|r\in[r_0+S_c-l_0 \sin \alpha_2, r_0+S_c+l_0 \sin \alpha_2], h\in[h_1,h_1+l_0 (1-\cos \alpha_2)]\}$.

(3) The process for calculating the braking parameters and the swing range in the swing mode, includes: in the case of rotation, the trolley and the cable are both stationary, and the cable pulls the object to move after the swing arm rotates. If rotation locking is performed, the braking time $$t = \frac{\omega}{\alpha}$$

and the braking distance $$\theta_d = \frac{\omega^2}{2\alpha}$$

of the swing arm are calculated, the braking angle of the swing arm after braking is $\theta_0+\theta_d$, and the swing range of the swing arm is $W_1=\{(r,\theta,h_0)|r\in(0,r_m], \theta\in(\theta_0,\theta_0+\theta_d]\}$. If it is assumed that the object still moves at the original velocity after rotation braking, the coordinate $(r_1,\theta_1+\omega t, h_1)$ of the object after braking is calculated, and after braking, the object does a conical pendulum motion with the trolley as a fixed end at an angular velocity of $$\omega' = \frac{r_1}{l_0 \sin\varphi_1}\omega,$$

where $\varphi_1$ is an angle between the cable and the vertical direction during the conical pendulum motion.

According to force balance of the object in the vertical and horizontal directions, an equation $$\begin{cases} F\sin\varphi_1 = ml_0\sin\varphi_1 \cdot \omega'^2 \\ F\cos\varphi_1 = mg \end{cases}$$

is obtained. A value of $\varphi_1$ is solved by means of the equation, where F is the pull force of the cable.

$\varphi_1$ is $$\varphi_1 = \arccos\left(\frac{-\lambda + \sqrt{\lambda^2 + 4}}{2}\right),$$

where $\lambda$ is $$\lambda = \frac{l_0}{gr_1^2\omega^2},$$

and the swing range $W_2$ of the object is a plane of $h=h_1$ and a circle with $(r_0, \theta_0+\theta_d, h_1)$ as the center of circle and $l_0 \sin \varphi_1$ as the radius, $W_2=\{(r,\theta,h_1)|r^2-2rr_0 \cos(\theta-\theta_0-\theta_d)+r_0^2=l_0^2 \sin^2\varphi_1\}$.

A total swing range is $W=W_1 \cup W_2$.

(4) The process for calculating the braking parameters and the swing range in the rotation and amplitude change mode, includes:

In the case of rotation and amplitude change, if rotation locking and amplitude change locking are performed at the same time, the coordinate $$\left(r_0 + \frac{v_r^2}{2a_r}, \theta_0 + \frac{\omega^2}{2\alpha}, h_0\right)$$

of the trolley after braking is calculated. The braking time $$t = \frac{\omega}{\alpha}$$

and the braking distance $$\theta_d = \frac{\omega^2}{2\alpha}$$

of the swing arm are calculated, the braking angle of the swing arm is $\theta_0+\theta_d$, and the swing range of the swing arm is $W_1=\{(r,\theta,h_0)|r\in(0,r_m],(\theta_0,\theta_0+\theta_d]\}$. After braking, the object does the conical pendulum motion with the trolley as a fixed node, such that in order to improve the safety, $v_1$ before braking is taken as the motion velocity of the object. According to the force balance of the object in the vertical and horizontal directions, the following equation may be obtained:

$$\begin{cases} F\sin\varphi_1 = \frac{mv_1^2}{l_0\sin\varphi_1} \\ F\cos\varphi_1 = mg \end{cases}.$$

An angle $\varphi_1$ between the cable and the vertical direction is calculated according to the equation.

$$\varphi_1 = \arccos\left(\frac{-\lambda + \sqrt{\lambda^2 + 4}}{2}\right),$$

where $\lambda$ is $$\lambda = \frac{v_1^2}{l_0 g},$$

and the swing range $W_2$ of the object is a plane of $h=h_1$ and a circle with $$\left(r_0 + \frac{v_r^2}{2a_r}, \theta_0 + \frac{\omega^2}{2\alpha}, h_1\right)$$

as the center of circle and $l_0 \sin \varphi_1$ as the radius, namely, $$W_2 = \left\{(r, \theta, h_1)\,\middle|\, r^2 - 2rr\left(r_0 + \frac{v_r^2}{2a_r}\right)\cos\left(\theta - \theta_0 - \frac{\omega^2}{2\alpha}\right) + \left(r_0 + \frac{v_r^2}{2a_r}\right)^2 = \int_0^2 \sin^2\varphi_1\right\}.$$

A total swing range is $W=W_1 \cup W_2$.

(5) The process for calculating the braking parameters and the swing range in the hoisting and amplitude change mode, includes:

In the case of hoisting and amplitude change, if vertical locking and transverse locking are achieved at the same time, the length $$l'_0 = l_0 + \frac{v_c^2}{2a_c}$$

of the cable after braking is calculated.

The calculation method for the rest is similar to the amplitude change mode. If it is assumed that the object still moves forward at the original velocity when braking starts, the coordinate of the object after braking is as follows:

$$\left(r_1 + v_1 t, \theta_1, h_1 + \frac{v_c^2}{2a_c}\cos\alpha_1 + l'_0(1 - \cos\alpha_1)\right),$$

where $\alpha_1$ is an angle between the cable and the vertical direction after braking, and $$\alpha_1 = \arctan\frac{r_1 + v_1 t - r_0 - S_c}{l'_0}.$$

After braking, the object starts to do the simple pendulum motion, and the velocity component of the object perpendicular to the cable is $v_1 \cos \alpha_1$. Due to energy conservation, the ascent height $$\Delta h = \frac{v_1^2 \cos^2\alpha_1}{2g}$$

of the object at the maximum swing amplitude is calculated, where g is the acceleration of gravity. The angle between the cable and the vertical direction is $$\alpha_2 = \arccos\frac{l'_0\cos\alpha_1 - \Delta h}{l'_0}.$$

The coordinate of the object at the maximum swing amplitude is $(r_0+S_c \pm l_0' \sin \alpha_2, \theta_1, h_1+l_0'(1-\cos \alpha_2))$. Thus, the swing range is as follows:

$$W=\{(r,\theta_1,h)|r\in [r_0+S_c-l_0' \sin \alpha_2, r_0+S_c+l_0' \sin \alpha_2], h\in [h_1, h_1, l_0'(1-\cos \alpha_2)]\}.$$

(6) The process for calculating the braking parameters and the swing range in the hoisting and rotation mode, includes:

In the case of hoisting and rotation, if vertical locking and transverse locking are achieved at the same time, the length $$l'_0 = l_0 + \frac{v_c^2}{2a_c}$$

of the cable after braking is calculated. The remaining process is close to the rotation mode. The braking time $$t = \frac{\omega}{\alpha}$$

and the braking distance $$\theta_d = \frac{\omega^2}{2\alpha}$$

of the swing arm are calculated, the braking angle of the swing arm is $\theta_0+\theta_d$, and the swing range of the swing arm is $W_1=\{(r,\theta,h_0)|r\in(0,r_m], \theta\in(\theta_0,\theta_0+\theta_d]\}$.

If it is assumed that the object still moves forward at the original velocity after braking, the coordinate of the object after braking is $$\left(r_1, \theta_1 + \omega t, h_1 + \frac{v_c^2}{2a_c}\right).$$

The object does the conical pendulum motion with the trolley as the fixed end at the angular velocity of $$\omega' = \frac{r_1}{l_0\sin\varphi_1}\omega,$$

where $\varphi_1$ is the angle between the cable and the vertical direction during the conical pendulum motion.

According to the force balance of the object in the vertical and horizontal directions, the equation $$\begin{cases} F\sin\varphi_1 = ml'_0\sin\varphi_1 \cdot \omega'^2 \\ F\cos\varphi_1 = mg \end{cases}$$

is obtained. The value of $\varphi_1$ is solved according to the equation, where F is the pull force of the cable. $\varphi_1$ is $$\varphi_1 = \arccos\left(\frac{-\lambda + \sqrt{\lambda^2 + 4}}{2}\right),$$

where $\lambda$ is $$\lambda = \frac{l'_0}{gr_1^2\omega^2},$$

and the swing range $W_2$ of the object is a plane of $$h = h_1 + \frac{v_c^2}{2a_c}$$

and a circle with $$\left(r_1, \theta_1 + \theta_d, h_1 + \frac{v_c^2}{2a_c}\right)$$

as the center of circle and $l_0'$ sin φ as the radius, namely, $$W_2 = \left\{\left(r, \theta, h_1 + \frac{v_c^2}{2a_c}\right) \middle| r^2 - 2rr_0\cos(\theta - \theta_0 - \theta_d) + r_0^2 = l_0'^2\sin^2\varphi_1\right\}.$$

A total swing range is $W = W_1 \cup W_2$.

(7) The process for calculating the braking parameters and the swing range in the hoisting, rotation and amplitude change mode, includes:

In the case where three motions of hoisting, rotation and amplitude change occur at the same time, the coordinate $$\left(r_0 + \frac{v_r^2}{2a_r}, \theta_0 + \frac{\omega^2}{2\alpha}, h_0\right)$$

of the trolley after braking is calculated; the length $$l_0' = l_0 + \frac{v_c^2}{2a_c}$$

of the cable after braking is calculated; and the braking time $$t = \frac{\omega}{\alpha}$$

and the braking distance $$\theta_d = \frac{\omega^2}{2\alpha}$$

of the swing arm are calculated, the braking angle of the swing arm is $\theta_0 + \theta_d$, and the swing range of the swing arm is $W_1 = \{(r,\theta,h_0) | r \in (0, r_m], \theta \in (\theta_0, \theta_0 + \theta_d]\}$. After braking, the object does the conical pendulum motion with the trolley as the fixed node, such that in order to improve the safety, $v_1$ before braking is taken as the motion velocity of the object. According to the force balance of the object in the vertical and horizontal directions, the following equation may be obtained:

$$\begin{cases} F\sin\varphi_1 = \frac{mv_1^2}{l_0'\sin\varphi_1} \\ F\cos\varphi_1 = mg \end{cases}$$

An angle $\varphi_1$ between the cable and the vertical direction is calculated according to the equation.

$$\varphi_1 = \arccos\left(\frac{-\lambda + \sqrt{\lambda^2 + 4}}{2}\right),$$

wherein λ is $$\lambda = \frac{v_1^2}{l_0'g},$$

and the swing range $W_2$ of the object is a plane of $$h = h_1 + \frac{v_c^2}{2a_c}$$

and a circle with $$\left(r_0 + \frac{v_r^2}{2a_r}, \theta_0 + \frac{\omega^2}{2\alpha}, h_1 + \frac{v_c^2}{2a_c}\right)$$

as the center of circle and $l_0'$ sin φ as the radius, namely, $$W_2 = \left\{\left(r, \theta, h_1 + \frac{v_c^2}{2a_c}\right) \middle| r^2 - 2r\left(r_0 + \frac{v_r^2}{2a_r}\right)\cos(\theta - \theta_0 - \theta_d) + \left(r_0 + \frac{v_r^2}{2a_r}\right)^2 = l_0'^2\sin^2\varphi_1\right\}.$$

A total swing range is $W = W_1 \cup W_2$.

Step S60: whether a collision may occur is determined according to the swing range and the obstacle node set $U_0$.

It includes: a determination condition is set as $W_s \cap U_t \neq \emptyset$, where $W_s$ is an updated swing range after a safety margin is added to the swing range W, $W_s\{(r,\theta,h) | (r\cos\theta - r_i\cos\theta_i)^2 + (r\sin\theta - r_i\sin\theta_i)^2 + (h - h_i)^2 \leq r_s^2, (r_i,\theta_i,h_i) \in W\}$, and $U_t$ is a node set including grid coordinates $(r_t, \theta_t, h_t)$ of an outer contour of the construction site.

If an intersection set of the node set $U_t$ and the swing range $W_s$ is a null set, it is considered safe, otherwise it is considered that the collision may occur.

Step S70: if not, the tower crane is controlled to continue to transport the object according to the hoisting and transporting path.

During transporting, Steps S50 and S60 continue to be performed always at a set frequency, and until the tower crane transports the object to a coordinate of a predetermined node, the object has a speed of v=0 and an acceleration of α≤0

Step S80: if yes, the tower crane is controlled to be braked.

According to the operation mode such as the hoisting mode, the amplitude change mode, the rotation mode, the rotation and amplitude change mode, the hoisting and amplitude change mode, the hoisting and rotation mode and the hoisting, rotation and amplitude change mode, vertical locking, transverse locking and rotation locking are correspondingly performed to brake the tower crane.

Step S90: whether the tower crane may be overturned is predicted according to a preset overturning calculation strategy during braking of the tower crane.

Specifically, the overturning calculation strategy includes: when a vertical maximum braking acceleration during braking is set to be $\bar{\alpha}_c$, a maximum hoisting moment during braking is $$\overline{M} = \left(F_c + \frac{F_c}{g}\cdot\bar{a}_c\right)\cdot\left(r_0 + \frac{v_r^2}{2a_r}\right),$$

and when a maximum moment of the tower crane is $M_{max}$, an overturning determination condition is $\lambda\overline{M} > M_{max}$, where λ is a safety factor, and λ is greater than 1.

The automatic hoisting and transporting method for the tower crane in the present invention replaces a manned driving mode, and plans the hoisting and transporting path on the basis of the three-dimensional grid model for the construction site, thereby optimizing an aggregate data structure, greatly shortening the calculation time, and improving the efficiency of path planning; by generating the obstacle node set, the problem of visual blind zones in manned driving is avoided, and relevant nodes can be avoided during path planning, so as to ensure that the object does not collide with the obstacle during hoisting and transporting to guarantee safe operation of the tower crane; the aerial hoisting and transporting path is planned according to the preset path planning strategy and the coordinates of the initial node and the end node of hoisting and transporting operation, such that the heavy object is transported with higher efficiency under the condition of no collision, and the time and effort are saved; and whether the tower crane may be overturned is predicted according to the preset overturning calculation strategy during transportation, so as to prevent dangerous events from happening.

The present invention is further described above with the help of specific embodiments, but it should be understood that the specific description here should not be construed as a limitation to the spirit and scope of the present invention. Various modifications made to the above-mentioned embodiments by those of ordinary skill in the art upon reading this specification fall within the scope of protection of the present invention.

The invention claimed is:

1. An automatic hoisting and transporting method for a tower crane, the method comprising:
   building a three-dimensional grid model for a construction site, and generating a grid node set $\Phi_0$;
   generating an obstacle node set $U_0$ and a feasible area node set $\Phi_1$ according to a position of an obstacle in the construction site and the grid node set $\Phi_0$;
   obtaining coordinates of an initial node S and an end node G by means of the three-dimensional grid model;
   planning a hoisting and transporting path from the initial node S to the end node G according to the initial node S, the end node G, the feasible area node set $\Phi_1$ and a preset hoisting and transporting path planning strategy, and generating corresponding operating parameters;
   controlling the tower crane to transport an object according to the operating parameters, and calculating a swing range of the hoisted and transported object and a swing arm at a current position according to a preset swing range calculation strategy;
   determining whether a collision may occur according to the swing range and the obstacle node set $U_0$;
   if not, controlling the tower crane to continue to transport the object according to the hoisting and transporting path;
   if yes, controlling the tower crane to be braked; and
   predicting whether the tower crane may be overturned according to a preset overturning calculation strategy during braking of the tower crane;
   wherein the obtaining coordinates of an initial node S and an end node G by means of the three-dimensional grid model, comprises:
   setting a coordinate of the center of a tower crane base in a Cartesian coordinate system to be $(a_0, b_0, c_0)$;
   obtaining the coordinates of the initial point S and the end point G in the Cartesian coordinate system, the coordinates being respectively $(a_s, b_s, c_s)$ and $(a_g, b_g, c_g)$;
   transforming the coordinates of the initial point S and the end point G in the Cartesian coordinate system into coordinates in the three-dimensional grid model, the coordinates in the three-dimensional grid model being respectively an initial point $S(x_s, y_s, z_s)$ and an end point $G(x_g, y_g, z_g)$, wherein $$\begin{cases} x_s = a_s - a_0 \\ y_s = b_s - b_0 \\ z_s = c_s - c_0 \end{cases}, \begin{cases} x_g = a_g - a_0 \\ y_g = b_g - b_0 \\ z_g = c_g - c_0 \end{cases};$$

and
   obtaining size information of the hoisted and transported object, and determining a centroid coordinate $(x_m, y_m, z_m)$ of the hoisted and transported object and a maximum distance $l_m$ between an edge of the hoisted and transported object and the centroid coordinate $(x_m, y_m, z_m)$, or in the absence of the hoisted and transported object, determining a centroid coordinate of a hoist hook and a maximum distance between an edge of the hoist hook and the centroid coordinate.

2. The automatic hoisting and transporting method for a tower crane according to claim 1, wherein the building a three-dimensional grid model for a construction site, and generating a grid node set $\Phi_0$, comprises:
   obtaining a preset allowable amplitude change range $[r_{min}, r_{max}]$, allowable rotation range $[\theta_{min}, \theta_{max}]$, and allowable hoisting range, $[h_{min}, h_{max}]$ of the tower crane;
   respectively performing m、n、P equal division on the allowable amplitude change range $[r_{min}, r_{max}]$, the allowable rotation range $[\theta_{min}, \theta_{max}]$, and the allowable hoisting range $[h_{min}, h_{max}]$ of the tower crane; and
   generating the grid node set $\Phi_0$ of nodes $(r,\theta,h)$ as follows:

$$\Phi_0 = \left\{ (r_i, \theta_j, h_k) \middle| \begin{cases} r_i = r_{min} + \frac{r_{max} - r_{min}}{m} \times i, i = 0, 1, \ldots, m \\ \theta_j = \theta_{min} + \frac{\theta_{max} - \theta_{min}}{n} \times j, j = 0, 1, \ldots, n \\ h_k = h_{min} + \frac{h_{max} - h_{min}}{p} \times k, k = 0, 1, \ldots, p \end{cases} \right\},$$

wherein when m、n、p equal division is respectively performed on the allowable amplitude change range $[r_{min}, r_{max}]$, the allowable rotation range $[\theta_{min}, \theta_{max}]$, and the allowable hoisting range $[h_{min}, h_{max}]$ of the tower crane, m、n、p need to meet the following conditions:

$$\begin{cases} \Delta r = \frac{r_{max} - r_{min}}{m} \leq \min(1, l_m) \\ \Delta \theta = \frac{\theta_{max} - \theta_{min}}{n} \times r_{max} \leq \min(1, l_m) \\ \Delta h = \frac{h_{max} - h_{min}}{p} \leq \min(1, l_m) \end{cases}.$$

3. The automatic hoisting and transporting method for a tower crane according to claim 2, wherein the feasible area node set $\Phi_1$ is as follows:

$$\Phi_1 = \Phi_0 - (r,\theta,h) \left| \left\{ \begin{array}{l} |r-r_u| < l_m + l_{extra} \\ |\theta-\theta_u| \times r < l_m + l_{extra} , (r,\theta,h) \in \Phi_0, (r_u,\theta_u,h_u) \in U_0 \\ |h-h_u| < l_m + l_{extra} \end{array} \right. \right\}$$

wherein $(r_u,\theta_u,h_u)$ is a coordinate of an obstacle, $U_0$ is the obstacle node set, and $l_{extra}$ is a set amount of redundancy.

4. The automatic hoisting and transporting method for a tower crane according to claim 3, wherein a hoisting and transporting path planning strategy comprises:

searching the feasible area node set $\Phi_1$ for nodes closest to the initial node $S(x_s,y_s,z_s)$ and the end node $G(x_g,y_g,z_g)$, the nodes being respectively $(r_s,\theta_s,h_s)$ and $(r_g,\theta_g,h_g)$;

obtaining a preset safety height value, the safety height value comprising an ascent height value and a descent height value, the ascent height value and the descent height value being respectively $\bar{h}_s = h_s + m_{safe} \cdot \Delta h$, and $\bar{h}_g = h_g + m_{safe} \cdot \Delta h$, wherein $m_{safe}$ is the number of grids for ascent or descent, and $\Delta h$ is the height of one grid;

establishing a reachable node set and an unconcerned node set;

putting an aerial initial node $\bar{S}(r_s,\theta_s,\bar{h}_s)$ into the reachable node set, skipping nodes in the unconcerned node set, adding reachable nodes adjacent to the aerial initial node $\bar{S}$ in the feasible area node set $\Phi_1$ to the reachable node set, and setting parent nodes of these nodes as $\bar{S}(r_s,\theta_s,\bar{h}_s)$;

putting the aerial initial node $\bar{S}(r_s,\theta_s,\bar{h}_s)$ into the unconcerned node set;

calculating cost values $f(n)=g(n)+h(n)$ of all nodes in the reachable node set, wherein $g(n)$ represents an actual cost from the aerial initial node S to a node $n(r_n,\theta_n,h_n)$ $h(n)$ represents an estimated cost from the node $n(r_n,\theta_n,h_n)$ to an aerial end node $\bar{G}(r_g,\theta_g,\bar{h}_g)$, and $h(n)=|r_n-r_g|+|\theta_n-\theta_g|+|h_n-\bar{h}_g|$; extracting a node N with a minimum cost value $f(n)$ from the reachable node set, and putting the node N into the unconcerned node set; skipping the nodes in the unconcerned node set, searching the feasible area node set $\Phi_1$ for all reachable nodes adjacent to the node N, and if the nodes are not in the reachable node set, adding the nodes to the reachable node set, and setting parent nodes of the nodes to be N; if the nodes are already in the reachable node set, calculating whether actual costs $g(n)$ from the node N to the nodes are less than previous values, and if yes, setting the parent nodes of the nodes to be N;

repeating the previous step, until the aerial end node $\bar{G}(r_g,\theta_g,\bar{h}_g)$, is added to the reachable node set; and starting from the aerial end node $\bar{G}(r_g,\theta_g,\bar{h}_g)$, moving along the parent node of each of the nodes, and until the aerial initial node $\bar{S}(r_s,\theta_s,\bar{h}_s)$ is reached, forming an aerial hoisting and transporting path, the hoisting and transporting path being from the initial node S, the aerial initial node $\bar{S}$, and the aerial end node $\bar{G}$ to the end node G.

5. The automatic hoisting and transporting method for a tower crane according to claim 1, wherein the building a three-dimensional grid model for a construction site, and generating a grid node set $\Phi_0$, comprises:

building a three-dimensional grid model for a construction site in a cylindrical coordinate system;

generating the grid node set $\Phi_0$ of nodes $(r,\theta,h)$;

with a central axis of a tower body of the tower crane $\alpha_s$ a longitudinal axis of a cylindrical coordinate, equally dividing angular coordinates $\theta$ into $\alpha$ parts by a set step length;

transforming the angular coordinates $\theta$ of all the nodes into integers between 0 and $\alpha-1$; and with the angular coordinates of the nodes as indexes of a first-level list, taking radius coordinates r and height coordinates h of the nodes as a second-level list.

6. The automatic hoisting and transporting method for a tower crane according to claim 5, wherein a hoisting and transporting path planning strategy comprises:

establishing a reachable node set and an unconcerned node set;

putting the initial node S into the reachable node set, setting a total cost f(s) and an actual cost g(s) of the initial node S to be 0, and setting a parent node thereof as itself;

in the reachable node set, selecting a node n with a minimum total cost f(n), and deleting the node n from the reachable node set, wherein a coordinate of the node n is $(r_n,\theta_n,h_n)$, the total cost of the node n is $f(n)=g(n)+h(n)$ $g(n)$ is the actual cost of the node n, h(n) is a heuristic function of the node n, $h(n)=k_1(h_{mid}-h_n)+k_2+k_3(|r_n-r_G|+|\theta_n-\theta_G|)+k_4|h_n-h_G|$, $k_1,k_2, k_3, k_4$ are preset weight functions, and $h_{mid}$ is a preset safety height value that needs to be ensured before wide-range horizontal motion;

obtaining a node m adjacent to the node n, and determining whether the node m belongs to the obstacle node set or the unconcerned node set, wherein a coordinate of the node m is $(r_m,\theta_m,h_m)$; if not, determining whether the node m is already in the reachable node set;

if the node m is not in the reachable node set, adding the node m to the reachable node set, setting the node n as a parent node of the node m, and calculating a total cost $f(m)=g(m)+h(m)$ of the node m, wherein g(m) represents an actual cost of moving from the initial node S to the node m via the parent node n thereof, $g(m)=g(n)+|r_m-r_n|+r_n\cdot|\theta_m-\theta_n|$, $|h_m-h_n|$, h(m) is a heuristic function of the node m, and $h(m)=k_1(h_{mid}-h_m)+k_2+k_3|r_m-r_G|+|\theta_m-\theta_G|)+k_4|h_m-h_G|$;

if the node m is already in the reachable node set, calculating a cost $l(m,n)=g(n)+|r_m-r_n|+r_n\cdot|\theta_m-\theta_n|$, $|h_m-h_n|$, of reaching the node m from the initial node S via a non-parent node n, comparing the cost $l(m,n)$ with the actual cost g(m), and if $l(m,n)<g(m)$, setting the node n as the parent node of the node m, setting the actual cost $g(m)=l(m,n)$, and updating the total cost f(m);

determining whether all adjacent nodes m of the node n are subjected to operation of the above steps, if yes, adding the node n to the unconcerned node set, and if not, determining whether other adjacent nodes m belong to the obstacle node set $U_0$ or the unconcerned node set, and performing subsequent steps;

after traversing all the adjacent nodes m of the node n, adding the node n to the unconcerned node set;

repeating the above steps, until the node selected from the reachable node set is the end node G; and starting from the aerial end node G, backtracking along the parent node of each of the nodes, and until the initial node S is reached, connecting backtracked nodes in sequence to obtain the hoisting and transporting path.

7. The automatic hoisting and transporting method for a tower crane according to claim 6, wherein the determining whether the node m belongs to the obstacle node set or the unconcerned node set, comprises:
  indexing the first-level list in the obstacle node set $U_O$ or the unconcerned node set with an angular coordinate $\theta_m$ of the node m to find the corresponding second-level list; and
  searching the corresponding second-level list for corresponding $(r_m, h_m)$.

8. The automatic hoisting and transporting method for a tower crane according to claim 7, wherein
an expression of a weight function $k_1$ is as follows:

$$k_1(n) = \begin{cases} 10, & d(n, S) < \rho \text{ and } h_n < h_{mid} \\ 0, & d(n, G) < \rho \\ 1, & \text{others} \end{cases},$$

wherein d(n,S) represents a Euclidean distance between the node n and the initial node S d(n,G) represents a Euclidean distance between the node n and the end node G, and P is a preset radius range.

9. The automatic hoisting and transporting method for a tower crane according to claim 8, wherein an expression of a weight function $k_2$ is as follows:

$$k_2(n) = \begin{cases} \lambda, & d(n, S) < \rho \text{ and } h_n < h_{mid} \\ 0, & \text{others} \end{cases},$$

wherein $\lambda$ is a constant greater than one order of magnitude of d(S,G), and d(S,G) represents a Euclidean distance between the initial node S and the end node G; an expression of a weight function $k_3$ is as follows:

$$k_3(n) = \begin{cases} 0, & d(n, S) < \rho \text{ and } h_n < h_{mid} \\ 1, & \text{others} \end{cases};$$

and a weight function $k_4$ is equal to a constant of 1.

10. The automatic hoisting and transporting method for a tower crane according to claim 9, wherein the safety height value is as follows:

$h_{mid} = \max(h_S, h_G) + (h_{max} - \max(h_S, h_G))/2$, wherein $h_{max}$ is an allowable maximum ascent height of the tower crane.

11. The automatic hoisting and transporting method for a tower crane according to claim 1, wherein the calculating a swing range of the object and a swing arm at a current position according to a preset swing range calculation strategy, comprises:
  identifying an operation mode of the tower crane, the operation mode comprising a hoisting mode, an amplitude change mode, a rotation mode, a rotation and amplitude change mode, a hoisting and amplitude change mode, a hoisting and rotation mode and a hoisting, rotation and amplitude change mode;
  calculating braking parameters according to the operation mode, the braking parameters comprising braking time of the swing arm, a braking distance of the swing arm, a braking angle of the swing arm, a braking distance of the object, a swing amplitude of the object, the length of a cable, an angle between the cable and a vertical direction, braking time of a trolley, and a braking distance of the trolley; and
  calculating the swing range of the object and the swing arm according to the braking parameters.

12. The automatic hoisting and transporting method for a tower crane according to claim 11, wherein the calculating the braking parameters and the swing range in the hoisting mode, comprises:
  calculating a braking distance $$S_m = \frac{v_c^2}{2a_c}$$

of the hoisted and transported object; $v_c$ being a velocity of the cable, and $\alpha_c$ being an average acceleration during vertical locking;
  the swing range being $W = \{(r_1, \theta_1, h) | h \in [h_1, h_1 + S_m]\}$; and $(r_1, \theta_1, h_1)$ being a coordinate of the hoisted and transported object;
  the calculating the braking parameters and the swing range in the amplitude change mode, comprises:
  calculating braking time $$t = \frac{v_r}{a_r}$$

of the trolley, a braking distance of the trolley being $$S_c = \frac{v_r^2}{2a_r};$$

$v_r$ being an amplitude change velocity of the trolley, and $\alpha_r$ being an average acceleration during transverse locking;
  a coordinate of the object after braking being $(r_1 + v_1 t, \theta_1, h_1 + l_0(1 - \cos \alpha_1))$, wherein $v_1$ is a velocity of the hoisted and transported object, $l_0$ is the length of the current cable, $\alpha_1$ is an angle between the cable and the vertical direction after braking, $$\alpha_1 = \arctan \frac{r_1 + v_1 t - r_0 - S_c}{l_0},$$

and $r_0$ is an amplitude of the trolley;
  a velocity component of the object perpendicular to the cable being $v_1 \cos \alpha_1$, calculating an ascent height $$\Delta h = \frac{v_1^2 \cos^2 \alpha_1}{2g}$$

of the object, g being a gravitational acceleration;
  calculating an angle $$\alpha_2 = \arccos \frac{l_0 \cos \alpha_1 - \Delta h}{l_0}$$

between the cable and the vertical direction;
  a coordinate of the object at a maximum swing amplitude being $(r_0 + S_c \pm l_0 \sin \alpha_2, \theta_1, h_1 + l_0 (1 - \cos \alpha_2))$; and
  the swing range being $\alpha_s$ follows:
  $W = \{(r, \theta_1, h) | r \in [r_0 + S_c - l_0 \sin \alpha_2, r_0 + S_c + l_0 \sin \alpha_2], h \in [h_1, h_1 + l_0 (1 - \cos \alpha_2)]\}$; and the calculating the braking parameters and the swing range in the rotation mode, comprises:

calculating braking time $$t = \frac{\omega}{\alpha}$$

and the braking distance $$\theta_d = \frac{\omega^2}{2\alpha}$$

of the swing arm, the braking angle of the swing arm being $\theta_0+\theta_d$; $\omega$ being an angular velocity of rotation, $\alpha$ being an average acceleration during rotation locking, and $\theta_0$ being a rotation angle;

the swing range of the swing arm being $W_1=\{(r,\theta,h_0)\ r\in(0,r_m],\theta\in(\theta_0,\theta_0+O_d]\}$ $r_m$ being the length of the swing arm, and $h_0$ being the height of the swing arm;

calculating a coordinate $(r_1,\theta_1+\omega t,h_1)$ of the object, the object doing a conical pendulum motion with the trolley $\alpha_s$ a fixed end at an angular velocity of $$\omega' = \frac{r_1}{l_0 \sin\varphi_1}\omega,$$

wherein $\varphi_1$ is an angle between the cable and the vertical direction during the conical pendulum motion;

solving a value of $\varphi_1$ according to an equation $$\begin{cases} F\sin\varphi_1 = ml_0\sin\varphi_1 \cdot \omega'^2 \\ F\cos\varphi_1 = mg \end{cases},$$

wherein F is a pull force of the cable;

$\varphi_1$ being $$\varphi_1 = \arccos\left(\frac{-\lambda+\sqrt{\lambda^2+4}}{2}\right),$$

wherein $\lambda$ is $$\lambda = \frac{l_0}{gr_1^2\omega^2},$$

and the swing range $w_2$ of the object is a plane of $h=h_1$ and a circle with $(r_0,\theta_0+\theta^d,h_1)$ as the center of circle and $l_0$ sin as the radius, namely, $W_2=\{r,\theta,h_1)|r^2-2rr_0\cos(\theta-\theta_0-O_d)-r_0^2=l_0^2\sin^2\varphi_1\}$; and a total swing range being $W=W_1\cup W_2$.

13. The automatic hoisting and transporting method for a tower crane according to claim 12, wherein the calculating the braking parameters and the swing range in the hoisting, rotation and amplitude change mode, comprises:

calculating a coordinate $$\left(r_0+\frac{v_r^2}{2a_r},\theta_0+\frac{\omega^2}{2\alpha},h_0\right)$$

of the trolley after braking;

calculating the length $$l_0' = l_0 + \frac{v_c^2}{2a_c}$$

of the cable after braking;

calculating the braking time $$t = \frac{\omega}{\alpha}$$

and the braking distance $$\theta_d = \frac{\omega^2}{2\alpha}$$

of the swing arm, the braking angle of the swing arm being $\theta_0+\theta_d$, and the swing range of the swing arm being $W_1=\{(r,\theta,h_0)|r\in(0,r_m]\theta\in(\theta_0,\theta_0+\theta_d]\}$;

calculating an angle $\varphi_1$ between the cable and the vertical direction according to an equation $$\begin{cases} F\sin\varphi_1 = \frac{mv_1^2}{l_0'\sin\varphi_1} \\ F\cos\varphi_1 = mg \end{cases},$$

$$\varphi_1 = \arccos\left(\frac{-\lambda+\sqrt{\lambda^2+4}}{2}\right),$$

wherein $\lambda$ is $$\lambda = \frac{v_1^2}{l_0'g},$$

and the swing range $w_2$ of the object is a plane of $$h = h_1 + \frac{v_c^2}{2a_c}$$

and a circle with $$\left(r_0+\frac{v_r^2}{2a_r},\theta_0+\frac{\omega^2}{2\alpha},h_1+\frac{v_c^2}{2a_c}\right)$$

as the center of circle and $l_0'\sin\varphi$ as the radius, namely, $$W_2 = \left\{\left(r, \theta, h_1 + \frac{v_c^2}{2a_c}\right) \middle| \right.$$
$$\left. r^2 - 2r\left(r_0 + \frac{v_r^2}{2a_r}\right)\cos(\theta - \theta_0 - \theta_d) + \left(r_0 + \frac{v_r^2}{2a_r}\right)^2 = l_0'^2 \sin^2\varphi_1 \right\};$$

and a total swing range being $W = W_1 \cup W_2$.

14. The automatic hoisting and transporting method for a tower crane according to claim 13, wherein the determining whether a collision may occur according to the swing range and the obstacle node set $U_0$, comprises:

setting a determination condition $W_s \cap U_t \neq \emptyset$, wherein $W_s$ an updated swing range after a safety margin is added to the swing range W, $W_s = \{(r,\theta,h)(r\cos\theta - r_i\cos\theta_i)^2 + (r\sin\theta_i - r_i\sin\theta_i)^2 + (h-h_i)^2 \leq r_s^2, (r_i,\theta_i,h_i) \in W\}$, $U_t$ is a node set comprising grid coordinates $(r_t,\theta_t,h_t)$ of an outer contour of the construction site.

15. The automatic hoisting and transporting method for a tower crane according to claim 14, wherein the overturning calculation strategy comprises:

when a vertical maximum braking acceleration during braking is set to be $\overline{\alpha}_c$, a maximum hoisting moment during braking is $$\overline{M} = \left(F_c + \frac{F_c}{g}\cdot\overline{a}_c\right)\cdot\left(r_0 + \frac{v_r^2}{2a_r}\right).$$

and when a maximum moment of the tower crane is $M_{max}$, an overturning determination condition is $\lambda\overline{M} > M_{max}$, wherein $\lambda$ is a safety factor, and $\lambda$ is greater than 1.

* * * * *